May 19, 1970     B. A. SHADER     3,512,587
PHOTOELECTRICALLY CONTROLLED PLANT THINNERS
Filed Oct. 9, 1967     4 Sheets-Sheet 3

INVENTOR
BENJAMIN A. SHADER
BY
ATTORNEY

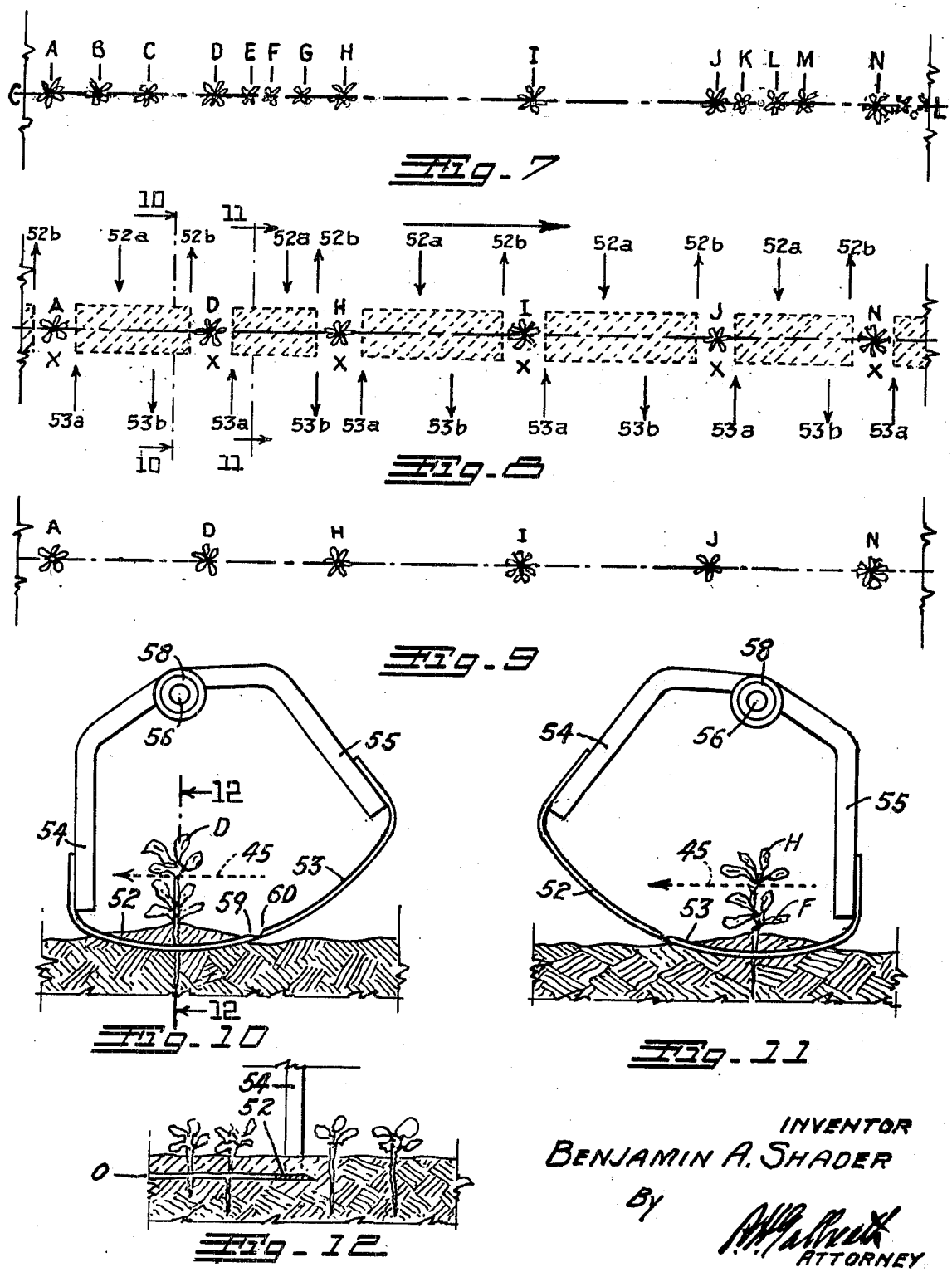

United States Patent Office 3,512,587
Patented May 19, 1970

3,512,587
PHOTOELECTRICALLY CONTROLLED PLANT THINNERS
Benjamin A. Shader, Denver, Colo., assignor to The Eversman Mfg. Company, Denver, Colo.
Filed Oct. 9, 1967, Ser. No. 673,598
Int. Cl. A10b 41/06
U.S. Cl. 172—57                                    4 Claims

ABSTRACT OF THE DISCLOSURE

A plurality of similar photoelectrically-controlled, pneumatically-actuated, plant-row-thinning assemblies adjustably mounted in side-by-side relation on a transverse tool bar, each assembly having two integrally-connected, pendulously-suspended, relatively narrow, arcuate, root-cutting knives positioned upon opposite sides of a plant row in axially spaced relation so as to be photoelectrically actuated, as they move along said row, to simultaneously swing both knives laterally of the row so that when one knife exits from the row the other knife will simultaneously enter the row forwardly of the point of exit of the first knife to leave standing plants between the successive axial root-cutting paths of said knives.

OBJECTS

Due to high labor costs, the necessary thinning of seeded row crops, such as cotton, sugar beets, and the like, by hand is becoming commercially impractical. Attempts have been made to separate the plant rows by cross-cultivating but this often cuts away blocks of desirable plants and leaves blocks of undesirable plants which still must be selectively hand thinned to produce commercially acceptable plants. Other attempts have been made to provide mechanical, wheel driven thinners under the control of an operator but these were slow in operation, inaccurate in results and required tiresome and constant attention. Electrically controlled thinning blades actuated by physical plant contact or by electrical plant contact have been attempted but these attempts have proven slow and unsatisfactory in practice due to the complexity of the electrical elements and to the uncertainty of the plant contacts under actual field conditions. Later attempts endeavored to control a thinning hoe through a photocell actuated by reflected light from the plants but the results were erratic and wasteful due to varying field conditions and varying atmospheric light conditions.

More recently photocell beams have been projected directly across the row of plants to initiate the action of electro-magnetically actuated thinning elements but due to weeds, plant leaves, irregular ground surfaces and inefficient thinning elements the results have not been satisfactory.

The principal object of this invention is to provide an automatically-selective row plant thinner for attachment to a multi-row tool bar which will avoid the difficulties above enumerated and which will electronically select the individual plants to be left in the final stand and remove the remainder without leaving blocks of miscellaneous or no plants.

Another object is to provide an automatic plant thinner which will undercut the roots of undesired plants without disturbing the soil of the plant row so as not to disturb the moisture, fertilizers and other desirable elements and conditions present in the seed zone of the soil.

A further object is to provide an electronically controlled plant thinner which will operate efficiently and precisely at relatively high speeds (up to three miles per hour) and which will be capable of carrying out 300 complete and accurate thinning cycles per minute without attention on the part of an operator.

A still further object is to provide means for lifting the plant leaves, without damage to the plant, so that a photocell beam can read the stalks of the plants without leaf interference.

Other objects and advantages reside in the detail construction of the invention, which is designed for simplicity, economy, and efficiency. These will become more apparent from the following description.

SPECIFICATION

In the following detailed description of the invention, reference is made to the accompanying drawings which form a part hereof. Like numerals refer to like parts in all views of the drawings and throughout the description.

In the drawings:

FIG. 7 is a diagrammatic plan view of a typical row of seedlings to be thinned by this invention;

FIG. 8 is a similar diagrammatic view of the same row of seedlings illustrating the progressive action of this invention thereon;

FIG. 9 is a similar diagrammatic view of the same row after it has been thinned by this invention;

Figure 1:
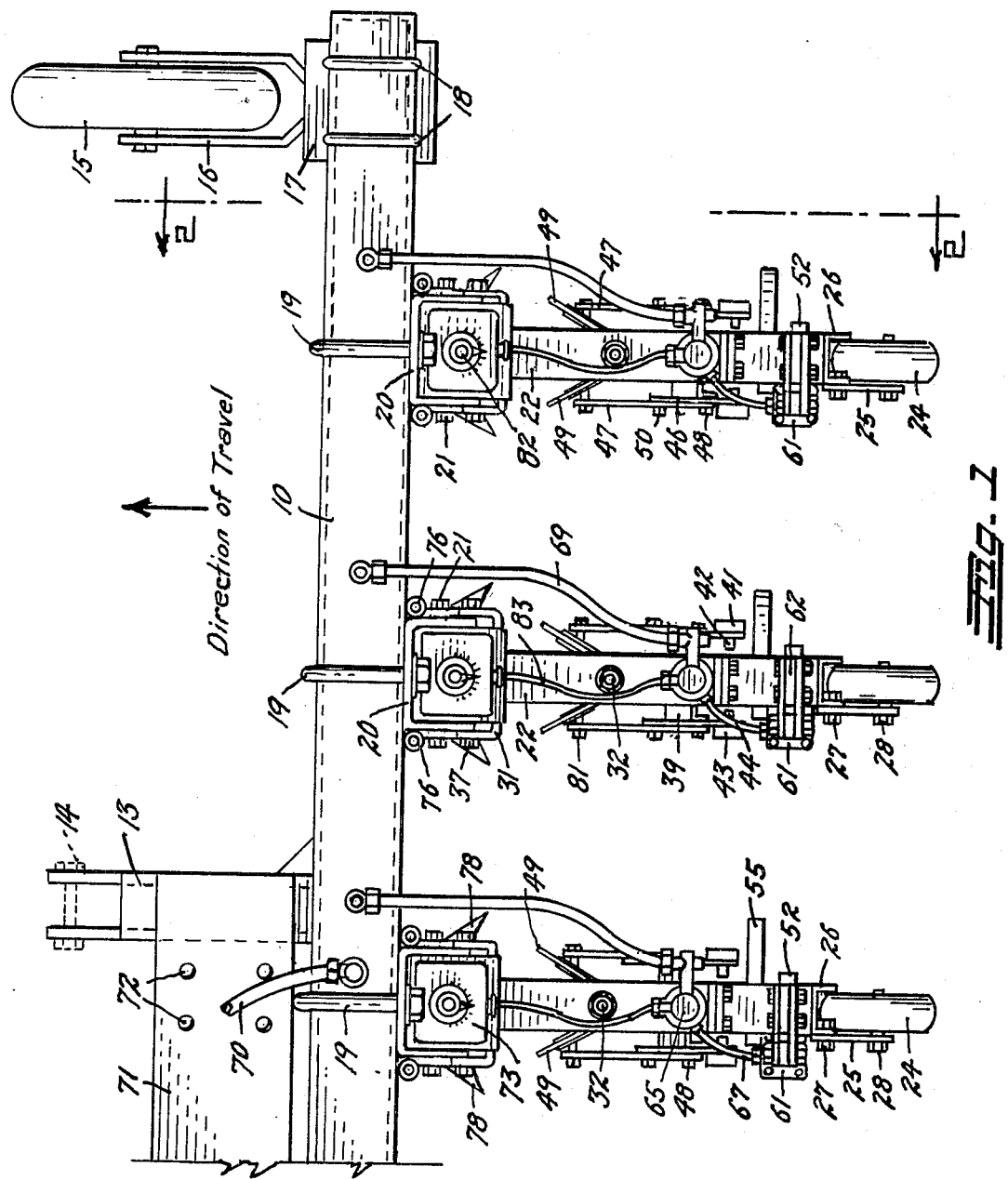
FIG. 1 is a top fragmentary plan view showing the right half of a six row arrangement of the present invention, it being understood that the left half thereof would be a continuation and a repetition of the half illustrated.
Figure 2:
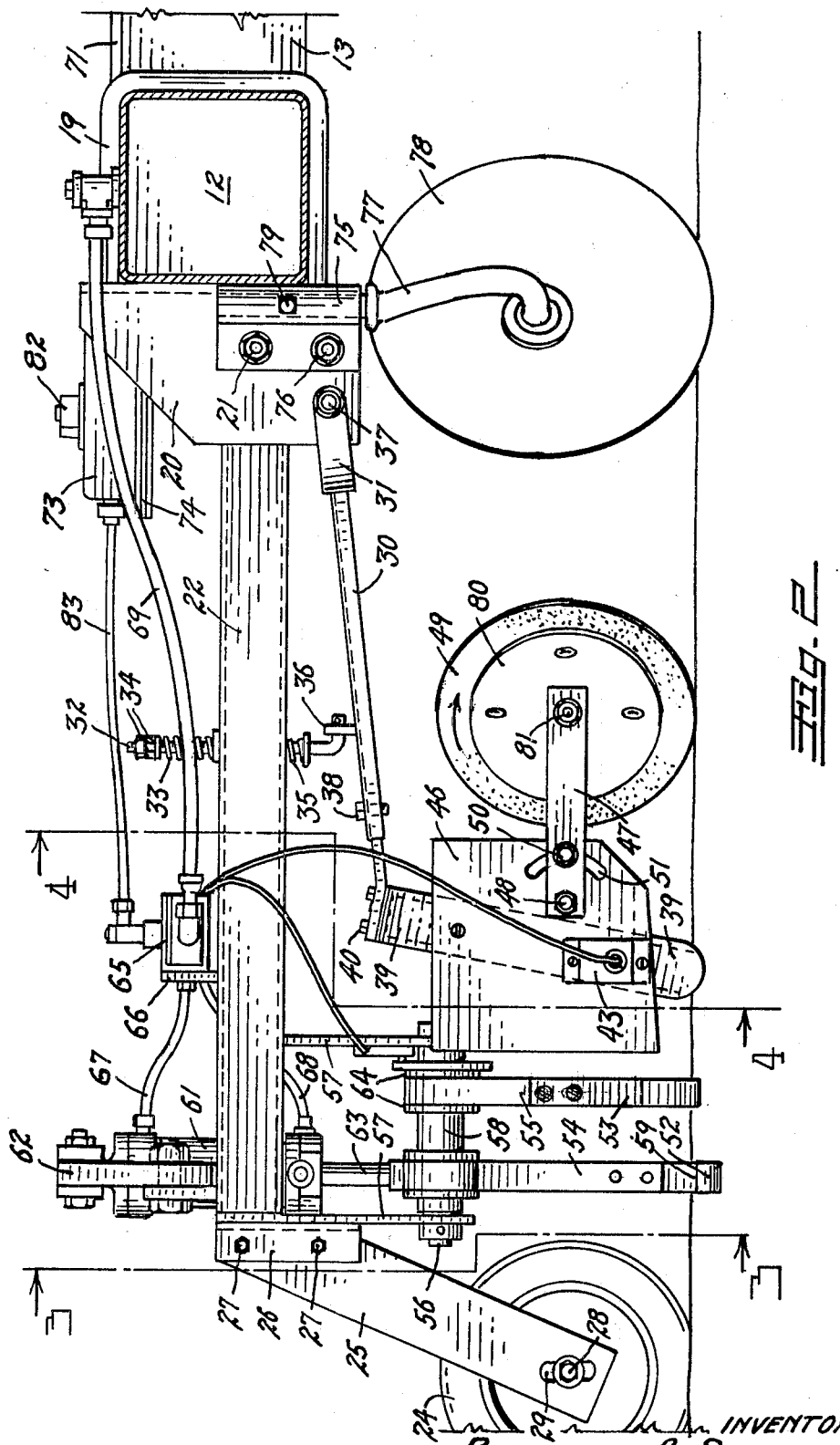
FIG. 2 is an enlarged, axially-extending sectional view taken on the line 2—2, FIG. 1.
Figure 3:
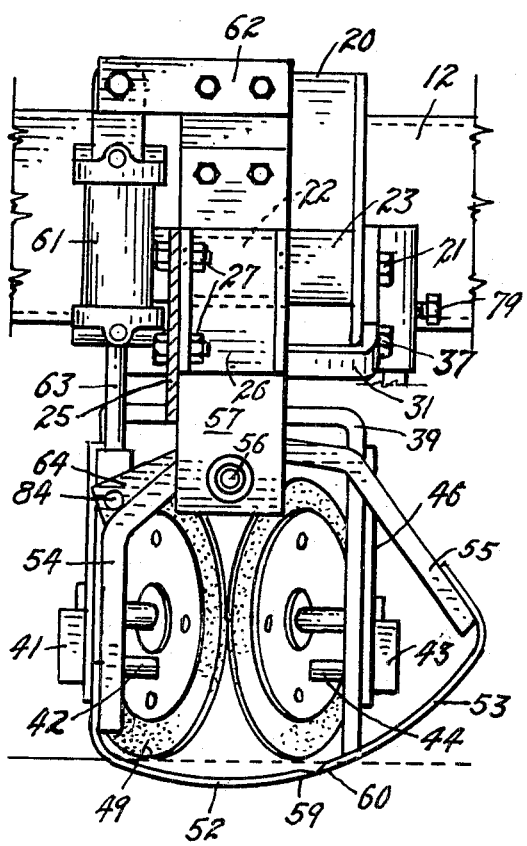
FIG. 3 is a similarly enlarged cross section taken on the line 3—3, FIG. 2.
Figure 4:
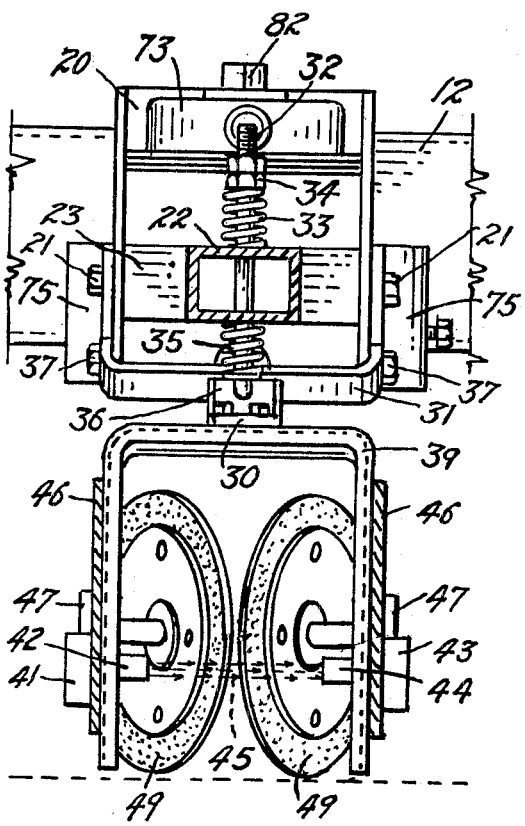
FIG. 4 is a similar cross section taken on the line 4—4, FIG. 2.

FIGS. 10 and 11 are enlarged diagrammatic cross sections taken through the row, on the lines 10—10 and 11—11, respectively, FIG. 7; and FIG. 12 is a similar diagrammatic longitudinal section of the row taken on the line 12—12, FIG. 10.

For multi-row operation, the invention employs an elongated, hollow, completely sealed tool-beam 12 of rectangular cross-section which also serves as a compressed air reservoir. Suitable towing tongues 13 extend forwardly from the mid-portion of the beam 12 terminating in tractor-attachment bolts 14 whereby the tool-beam may be attached to the three-point linkage of a conventional tractor so as to extend transversally and rearwardly thereof. The tool beam 12 is supported from the ground upon pneumatically-tired, ground-engaging wheels 15 mounted in wheel forks 16 extending forwardly from fork plates 17 clamped below each extremity of the tool beam 12 by means of conventional, vertical U-bolts 18.

A plurality of similar, row-thinning assemblies are clamped to the beam 12, by means of suitable, horizontal U-bolts 19, and are spaced apart along the beam to individually align with the plant rows of the field to be worked. Any practical number of thinning assemblies may be attached to a single beam. In FIG. 1 the right half of a six row arrangement is illustrated.

The thinning assemblies are similar and each employes a vertical channel-shaped mounting bracket 20, the bight of which is clamped to the rear face of the beam 12 by the U-bolt 19 and the two sides of which extend rearwardly in parallel relation to support a horizontal pivot bolt 21 upon which the forward extremity of a hollow, elongated, rearwardly-extending frame beam 22 is pivoted.

The forward extremity of the frame beam 22 is provided with a cross-head element 23 which is positioned between the two rearwardly extending sides of the mounting bracket 20 and through which the pivot bolt 21 extends to provide a vertically-pivoted mounting for the forward extremity of the frame beam 22. A vertically flanged mounting channel 26 is welded or otherwise mounted on the rear extremity of the frame beam to either flange of which a downwardly and rearwardly extending wheel arm 25 may be bolted by means of a suitable clamp bolts 27. A depth control wheel 24 is carried on the lower extremity of the wheel arm to support the rear extremity of the frame beam. The wheel 24 can be caused to travel on, or at either side of, the plant row by varying the position of the arm 25 on the flanges of the channel 26. A vertical adjustment can also be made by varying the position of the wheel axle, shown at 28, in a vertically elongated mounting slot 29 in the wheel arm 25.

A longitudinally-telescoping, photocell-supporting arm 30 is resiliently suspended below and in alignment with the frame beam 22 by means of a hooked, threaded suspension rod 32 which passes vertically downward through the frame beam and is hooked at its lower extremity through an upwardly extending transverse flange plate 36 on the arm 30. Downward movement of the rod 32 is cushioned by means of an upper compression spring 33 which surrounds the rod and urges adjusting nuts 34, threaded on the rod, upwardly. Upward movement of the rod is cushioned by a similar lower compression spring 35 which bears against the frame beam 22 and urges the rod downwardly.

The forward extremity of the arm is provided with a U-shaped mounting fork 31 which is pivotally mounted upon the opposite extremities of a hinge bolt 37 extending through the opposite sides of the mounting bracket 20 so that the rear extremity of the arm 30 is free to resiliently swing vertically cushioned by springs 33 and 35. The arm 30 is telescopic and can be locked in any desired extended position by a suitable lock screw 38.

An inverted-U-shaped, row-spanning yoke bar 39 is secured, by means of suitable screws 40, beneath, the rear extremity of the supporting arm 30. The two legs of the yoke bar extend downwardly in parallel relation on opposite sides of the plant row, resiliently supported by the upper spring 33. A light-shield-plate 46 is fixedly mounted on each leg of the yoke bar. A conventional exciter lamp case 43 is mounted upon one of the shield plates adjacent the bottom thereof, from which a lens tube 44 projects horizontally through the plate and through the yoke leg to project a light beam 45 toward the other leg of the yoke. A conventional photocell case 41, from which a light-receiving tube 42 projects, is similarly mounted on the other leg of the yoke bar 39 in a position to receive the light beam 45 from the lens tube 44 as is conventional in photoelectric cell installations. The light-shield plates 46 act to shield the photocell equipment from sunlight interference.

A weeder disc socket member 75 is secured to each side of the mounting bracket 20 by means of the pivot bolt 21 and an additional mounting bolt 76 to receive the standards, shown at 77, of conventional disc weeders 78, which may be locked in any desired angular ground-engaging position by means of suitable set-screws 79 so as to remove weeds and other undesirable debris from the sides of the plant row as the thinner progresses along the row.

Leaf-lifter arms 47 are pivotally mounted on the light-shield plates 46, as indicated at 48, and extend forwardly therefrom to rotatably support a pair of flexible leaf-lifting discs 49 to be later described in detail and which act to lift the leaves of eacch plant above the photoelectric light beam 45 to prevent leaf interference with the photocell actuation. The leaf lifter arms 47 can be vertically adjusted about their pivots 48 to position the lifting discs 49 at the most efficient height and then locked in the adjusted position by means of set screws 50 travelling in arcuate slots 51 in the shield plates 46.

Figure 5:
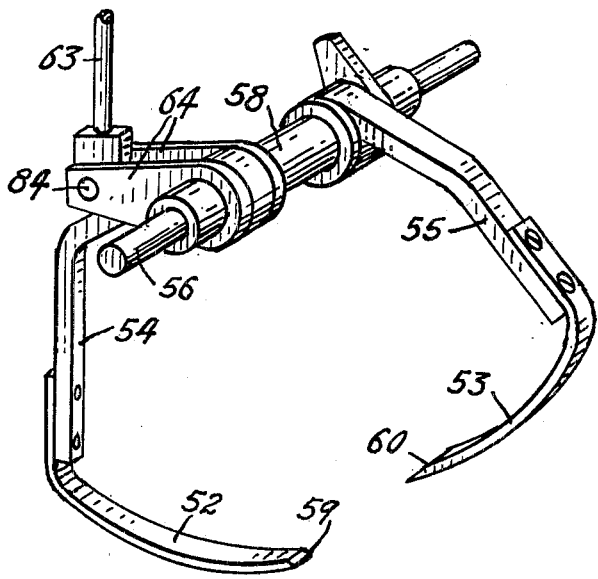
FIG. 5 is a detail, fragmentary, perspective view illustrating means for mounting root-cutting blades of the type employed in this invention.
Figure 6:
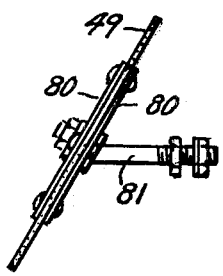
FIG. 6 is a detail top view illustrating a leaf lifting disc to be later described.

The actual thinning is accomplished by two relatively narrow, relatively thin, arcuate knife blades herein designated as the right front knife blade 53 and the left rear knife blade 52. The knife blades 52 and 53 are attached to, or unitarily formed on, the lower extremities of knife arms 54 and 55, respectively. The knife arms extend radially from the axis of a knife shaft 56 which is horizontally supported between two vertical, spaced-apart bearing plates 57 extending downwardly from adjacent the rear extremity of the frame beam 22. The knife blades 52 and 53 are arcuately concentric about the axis of the knife shaft 56 and are fixedly mounted in axially-spaced relation on a tubular hub sleeve 58 which rotatably surrounds the knife shaft 56, as shown in FIG. 5, so that both arms will swing back and forth as an integral unit. The row-entering points of the knife blades 52 and 53, indicated at 59 and 60, respectively, though axially spaced apart, are in axial alignment so that as one knife blade exits from the center line of the plant row the other blade will simultaneously enter the row from the opposite side.

The hub sleeve 58 and the attached knife arms 54 and 55 are reciprocally swung back and forth through the medium of a double acting pneumatic cylinder 61, suspended from a cylinder supporting bracket structure 62 on the forward extremity of the frame beam 22, which vertically actuates a piston rod 63 connected to a double crank arm 64 projecting from, and affixed to, the tubular hub sleeve 58.

A conventional four-way solenoid-actuated air valve assembly 65 is mounted upon a valve-mounting plate 66 which is secured to and extends laterally and upwardly from the frame beam 22. Cylinder hoses 67 and 68 extend from the valve assembly 65 to the upper and lower portions, respectively, of the cylinder 61 to actuate a conventional piston therein so as to reciprocally swing the knife blades to and from the plant row.

Compressed air is supplied to the solenoid-actuated valve assembly 65 of each thinner assembly through a supply hose 69 extending to and communicating with the hollow interior of the tool beam 12—the latter serving both as a tool support and as a compressed air reservoir.

Compressed air is supplied to the tool beam through a compressor hose 70 from any convenient source—preferably from a conventional air compressor (not shown) carried on a compressor platform 71 mounted on the tool beam 12. The compressor may be secured to the platform in any desired manner, such as by means of suitable bolts extending through bolt holes 72, and may be driven from the conventional power-take-off shaft of the tractor.

An electrical control box 73 supplied with current from the tractor battery, or other suitable source, in any conventional manner is mounted on a base plate 74 secured between, and extending forwardly from, the sides of the mounting bracket 20. The control box 73 contains conventional solid state electronic components and the necessary circuitry to translate the photocell signals for the purposes of this invention. Briefly, the control box includes: a photocell circuit which converts the electrical impulse created in the photocell by light beam interruption into a usable signal to operate the air valve solenoid; a time-delay circuit activated by the same signal which is manually adjustable by means of an external knob 82 on the control box to maintain the solenoid activated for a preset interval; and a photocell inhibitor circuit which deactivates the photocell at the end of the preset interval for a sufficient period of time to permit completion of the air valve and cylinder cycle before a succeeding signal can be sent forward by the photocell.

The photocell circuit includes a sensitivity adjustment by which the photocell can be set to provide a usable signal to the air valve solenoid when a relatively small object (say 3/16″) along the line of travel, breaks the light beam at a given speed (say 2 m.p.h.) or can be set less sensitively so that only larger objects (say ½″ to ¾″) along the line of travel will provide a usable signal. Usually, all plants in a seeding do not emerge at the same time or grow at the same rate. The sensitivity adjustment permits the thinning of small plants at the earliest possible date. As growth and emergence progress, and a mixture of small and larger plants appear in the row, a less sensitive adjustment permits the selection of larger and more vigorous plants for retention and elimination of the later emerging, smaller or less vigorous plants.

It will be apparent to those skilled in the art that any of a number of commercially available photocell circuits may be employed for control of the thinner assemblies and the details thereof are not important to the present invention. By way of example, typical circuits are shown in the U.S. Pats. to Hann 2,592,689, Chesebrough et al. 2,894,178, and Reeve et al. 3,425,495.

PRE-PREPARATION

For use on a particular field, the thinner assemblies are adjusted along the tool beam 12 to position each assembly in alignment with a plant row. The assemblies operate independently in consequence of conditions encountered along the particular row being followed by that assembly.

The disc weeders 78 are set in the proper weeding position. The depth control wheel 24 of each assembly is preset, as previously described, so that the blades will enter the ground slightly below the surface, as shown in FIG. 10 and FIG. 11, when the gauge wheel is travelling on the row or at either selected side thereof. The length of the photocell supporting arm is preadjusted to place the photocell beam the desired distance forwardly of the knife blades and the upper spring nuts 34 are adjusted to place the photocell beam the desired distance above the ground surface.

The leaf lifting discs are vertically adjusted so as to clear the ground and their point of contact adjusted so that, in gathering the plant leaves, contact with them will rotate the discs rearwardly at their bottom periphery gently lifting the gathered leaves above the path of the photo-electric beam as they travel forward, so that the stems of the plants, rather than the leaves, provide the photobeam interruption. The knob 82 on the control box 73 is preset to maintain the forward knife in the row for a sufficient time to provide the desired spaces between the plants.

OPERATION

To facilitate description of the operation of one of the thinning assemblies, a typical portion of a row of seedlings is illustrated in FIG. 7. The row contains a plurality of young plants in a variety of sizes and a variety of spacings as indicated alphabetically by the letters A through N. The purpose of this thinning assembly is to select and properly space the most desirable plants and eliminate the remainder, such as would be done manually by an experienced human beet thinner.

FIG. 8 illustrates the action of this invention if drawn along the same portion of the same row in the direction of the horizontal arrow. The points along the row where the right front knife blade 53 would enter the row are indicated by the lower row of ascending arrows 53a and the points where the blade 53 would exit from the row are indicated by the lower row of descending arrows 53b. The points where the left rear knife blade 52 would enter the row are indicated by the upper row of descending arrows 52a and the points where the blade 52 would exit from the row are indicated by the upper row of ascending arrows 52b. The center line of the row is indicated by the horizontal dash-dot line C–L and the areas along the row which will be undercut by the knife blades during passage of the thinner, as shown in FIGS. 10, 11 and 12, are indicated by the broken line crosshatched areas in FIG. 8. The undercutting severs the roots of the seedlings in the crosshatched, undercut areas below the surface as shown by the cut O in FIG. 12, and destroys the unwanted plants without disturbing or hoeing-away the soil of the row.

Now let us assume that the thinning assembly is travelling from left to right in FIG. 8 and the plant A has intercepted the photolight beam 45 to actuate the photocell circuit so as to swing the rear knife blade 52 from the row and simultaneously swing the front blade 53 into the row forwardly of the blade 52 so as to leave an undisturbed space $x$ about plant A, the width of the space being equal to the axial separation of the blades. The time delay circuit maintains the front blade 53 in the row for an interval, preset by the knob 82 to preserve minimum distance, after which the rear blade 52 will again enter the row to continue the undercutting until the photolight beam is intercepted by the plant D to leave a second undisturbed space $x$ about the plant D. It will be noted that plants B and C were within the "minimum distance" and were removed.

The above is now repeated, the time delay circuit holds the front blade 53 in the row for the minimum distance, after which the photolight beam is intercepted by the plant H to leave a third undisturbed space $x$ about plant H. Plants E, F and G were undercut since they were within the "minimum distance" from plant D. It will be noted that there are no intervening plants between plants H and I. Therefore, the front blade 53 will remain in the row with the photolight beam extinguished until the "minimum distance" interval of the time delay circuit has expired and it will then be replaced by the rear blade 52 and the photolight beam will be illuminated for receptive operation so that when the beam is interruped by the plant I a fourth undisturbed space $x$ will be left about plant I.

There are also no interventing plants between plant I and plant J so that the procedure described with reference to plants H and I will be repeated and a fifth undisturbed space $x$ will be left about plant J. In the row as illustrated there are three intervening plants, to wit, K, L and M between plants J and N but these are all within the "minimum distance" from plant J so that they will be eliminated by the undercutting blades during the "time delay circuit" interval so that the next cycle will be actuated by the photolight beam striking plan N to produce a sixth undisturbed space $x$ about plant N.

The above procedure is continued independently throughout the lengths of all of the rows covered by the thinning assemblies of the thinner so that the best possible spacings are obtained in all rows regardless of the natural emergence of the seedlings.

Attention is called to the fact that the control box knob 82 must be accurately preset in relation to the speed of the tractor and the tractor speed must be accurately maintained throughout the length of the rows since the spacing between points of interception of the light beams and the points of actuation of the blades must be accurately maintained to position the undisturbed row sections $x$ at the proper plant location.

In late stages of thinning, especially in sugar beets, later emerging or less vigorous plants are often mixed in with the stands of larger and more desirable plants. The inhibitor circuit with its sensitivity setting provides means for allowing the photobeam to ignore the smaller, less vigorous plants so that the undisturbed spaces $x$ will be properly positioned about the sturdy, larger plants.

Having thus described the invention what is claimed and desired to be secured by Letters Patent is:
 1. A plant thinning implement including:
  (a) an elongated supporting frame element adapted to be drawn along, and in longitudinal alignment over, a row of plants;
  (b) a knife shaft suspended from said frame element above and in axial alignment with said row;
  (c) a pair of integrally-connected, axially spaced apart plant-row-thinning assemblies rotatably mounted on said shaft, each assembly being fixed to a common hub means on said shaft and extending downwardly therefrom on each said of said plant row and extending toward said row, said assemblies being axially spaced, each assembly having an inner row-entering extremity, said extremities of said assemblies being in longitudinal alignment with respect to the plant row axis so that when the inner extremity of one assembly enters one side of said plant row the inner extremity of the other assembly begins to exit from said row; and (d) means for simultaneously swinging said pair of assemblies alternately back and forth transversely into said row.

2. A plant thinning implement including:
(a) an elongated frame beam vertically-pivoted at its forward extremity to a towing vehicle, and ground-wheel-supported at its rear extremity, adapted to be drawn along and in longitudinal alignment with the axis of a row of plants;
(b) a knife shaft horizontally suspended from the rear portion of said frame beam in axial alignment with the axis of said row;
(c) a hub-shaft-sleeve rotatably surrounding said knife shaft and provided with a radially projecting crank arm;
(d) a knife arm affixed to and projecting outwardly and downwardly from each extremity of said hub-shaft-sleeve on each side of said row axis and in longitudinally-spaced relation with each other;
(e) an elongated, relatively thin and relatively narrow knife blade secured at its outer extremity to the lower extremity of each of said arms, each knife blade extending inwardly toward said row axis on opposite sides of the latter with its inner row-entering extremity terminating substantially in longitudinal alignment with respect to the plant row axis with the inner row-entering extremity of the other knife blade so that the inner extremity of each knife blade will enter one side of said row as the other knife blade begins to exit from said row, said entries and exits being spaced from each other along said row in correspondence to the longitudinal spacing between said knife blades; and (f) actuating means connected with the crank arm of said shaft sleeve for reciprocally rotating the latter to laterally and simultaneously swing said knife blades back and forth across said row.

3. A plant thinning implement as described in claim 1 in which each of the plant-row-thinning assemblies comprises:
(a) a knife-supporting-arm extending outwardly and downward from said shaft; and
(b) an elongated knife blade secured at its outer extremity to said knife arm and extending inwardly toward and at substantially right angles to said row, said knife blade being relatively thin and relatively narrow and having a side cutting edge and having a semi-circular contour concentric about the axis of said shaft so that its inner extremity will enter said row from the side thereof and below the ground surface with minimum disturbance of the surface so that said cutting edge undercuts the plants as said implement moves longitudinally of said row.

4. A plant thinning implement as described in claim 3 having rotatable joining means on said shaft unitarily joining the upper extremities of said knife-supporting-arms in axially spaced apart relation along said shaft with the inner row-entering extremities of said knives substantially axially aligned with each other on opposite sides of said row and in spaced relation along said row.

References Cited
UNITED STATES PATENTS

| | | | |
|---|---|---|---|
| 2,706,437 | 4/1955 | Sanders | 172—57 |
| 2,592,689 | 4/1952 | Hann | 172—6 |
| 2,668,487 | 2/1954 | Marihart | 172—6 X |
| 2,894,178 | 7/1959 | Chesebrough et al. | 172—6 X |
| 3,127,724 | 4/1964 | Fraresso et al. | 171—58 X |
| 3,308,890 | 3/1967 | Rhode | 172—6 |
| 3,425,495 | 2/1969 | Reeve et al. | 172—6 X |

ROBERT E. PULFREY, Primary Examiner

S. C. PELLEGRINO, Assistant Examiner

U.S. Cl. X.R.

172—6, 686